N. POTTER, Jr.
Tree-Protector.
No. 29,098.
Patented July 10, 1860.
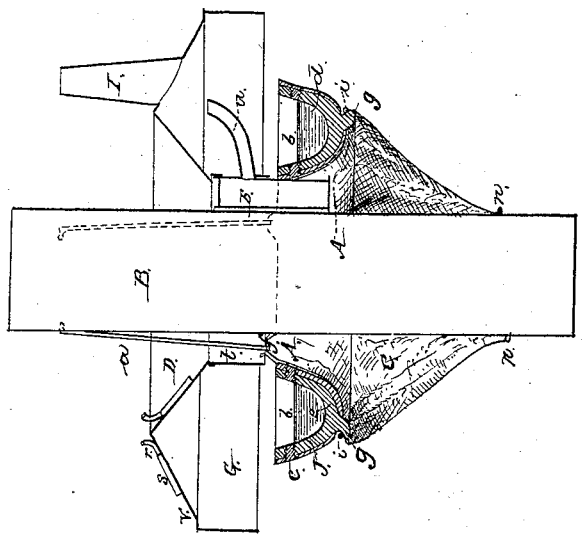
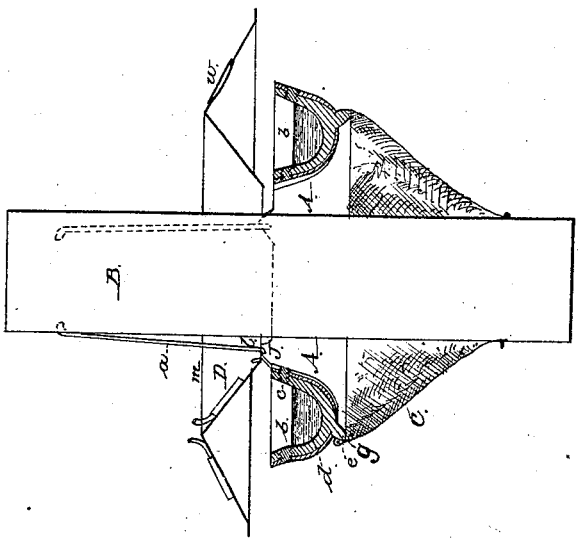
Witnesses:
Thos. R. Roach
P. E. Teschemacher
Inventor:
Nathaniel Potter Jr.
by Sam'l Cooper
Attorney

UNITED STATES PATENT OFFICE.

NATHANIEL POTTER, JR., OF SOUTH DARTMOUTH, MASSACHUSETTS.

IMPROVEMENT IN APPARATUS FOR PROTECTING TREES FROM INSECTS.

Specification forming part of Letters Patent No. 29,098, dated July 10, 1860.

*To all whom it may concern:*

Be it known that I, NATHANIEL POTTER, Jr., of South Dartmouth, in the county of Bristol and State of Massachusetts, have invented certain new and useful Improvements in Apparatus for Protecting Trees from Insects, of which the following is a full, clear, and exact description, reference being had to the accompanying drawings, making part of this specification, in which—

Figure 1 is a longitudinal vertical section through the body of a tree, and a transverse section through my improved protector as applied to the tree; Fig. 2, the same sections with the addition of a lamp and reflector which I employ when flying insects are to be trapped.

In protecting trees from insects which ascend their trunks from the ground a trough (A of these drawings) of cast-iron or other suitable material has been placed around the body of the tree, the trough being formed in two portions suitably connected together, so that it could be applied to the tree, and being suspended by wires $a$, attached to the inner edge of the trough and to the bark of the tree, thus leaving a space between the body of the tree and the trough to allow for the growth of the tree. This trough was intended to be partially filled, as at $b$, with some fluid obnoxious to or destructive of the insects. To prevent the insects from ascending between the tree and the trough and to guide them up on the outside of the trough, which they could not cross, an apron of cotton cloth or some other flexible material has been attached to the inner edge of the trough and to the tree.

The first part of my invention consists in an improved construction of the trough A, which offers greater facilities for attaching the apron to the trough.

The third part of my invention consists in combining with the trough and its covering a lamp and reflector to throw a circle of light around the trough to attract such insects into it as fly at night and are destructive to the fruit.

I may here remark that as the insects which crawl up the trees are to be guarded against and entrapped at a different season of the year from those which fly and are attracted by the light of a lamp at night, the same trough may be used for both with the additions and arrangement which I will presently explain.

That others skilled in the art may understand and use my invention, I will proceed to describe the manner in which I have carried out the same.

In the said drawings, B is the tree; A, the trough, of cast-iron, formed in two semicircular portions, which are joined together by a lap-joint at $d$, one portion being depressed or recessed and the other portion overlapping the lip $e$ thus formed, where it is secured by screws $c$. This trough is placed around the body of the tree, and its two sections are secured together so as to make a tight joint. It is suspended from and connected with the tree by wires $a$, which hook into holes in the ears $f$, formed on the inner edge of the trough, and are driven into the bark of the tree.

On the bottom of the trough A, around its whole circumference, is cast a flange, $g$, which is inclined toward the outer side of the trough. This flange is for the convenience of attaching the apron C, of cotton cloth or other flexible material, which is intended to prevent the insects which ascend the trunk of the tree from passing between the tree and the trough A. It has a hem turned over at each edge, in which is inserted a wire. At its top the wire $i$ is drawn over the flange $g$, and is secured by twisting together the ends of this wire. In the bottom hem is inserted in the same way a wire, $n$, by which the apron is secured to the tree. In this way the apron C may be more easily attached or removed than it could be when secured to the inner edge of the trough, as formerly, while there is less liability to have openings left for insects to pass through, as frequently happened, particularly where the wires $a$ were attached to the trough.

The head or covering D, which is intended to protect the contents of the trough A, is made of sheet-tin or other suitable material, struck up or formed, as shown in Fig. 1, with an angle at $m$, with its inner edge, $l$, corresponding in size with the inner edge of the trough A, and its outer edge, $p$, extending a little over the outer edge of the trough. It is formed with a joint on one side, so that it may be sprung open to place it round the tree when its ends are secured together by wire staples $r$, one leg of which is inserted in a socket, s, in each end of the hood; or, if preferred, it may be made of two semicircular pieces to be attached at opposite sides of the tree. When in position, as in Fig. 1, this hood rests on the wires a or on the top of the inner edge of the trough, and may be readily lifted up above the trough to inspect or cleanse the trough or replenish the liquid in it. When, later in the season, such insects as injure the fruit are flying, and it is desired to trap them, I employ, in addition to the apparatus just described, a lamp, E, which is made to fit between the trough A and the body of the tree between the wires a, where it is held securely by a band of tin, t, passing around the tree. It is furnished with a wick-tube, u, which projects over the trough A. With large trees I would place a lamp, E, on each side of the tree. When this lamp is used the hood D is raised up and rests on top of the lamp, as shown in Fig. 2. It also has applied to it a reflector, G, which is a simple ring of bright tin made with a lip, v, projecting inward from its edge, which rests on the outer edge of the hood D. The ends where it is joined are connected by a staple in the same manner as the ends of the hood.

A small chimney, I, Fig. 2, to carry off the smoke from the lamp, is made to fit over a hole in the top of the hood D. When the lamp is not used this hole is closed by a piece of tin, w, Fig. 1, which is slipped into the grooves which hold the bottom of the chimney, there being a small flange or lip on each side of the chimney, which slides in a groove formed on the top of the hood.

Instead of the flange g, a series of inclined pins may project from the bottom of the trough A; but this I should consider as the equivalent of the flange.

The hood D, if preferred, may be a simple curved piece without the angle m.

What I claim as my invention, and desire to secure by Letters Patent, is—

1. The flange g on the trough A, substantially as described, for the purpose specified.

2. In combination with the hood D and trough A, the lamp E and reflector G, arranged and operating substantially in the manner and for the purpose specified.

NATHANIEL POTTER, Jr.

Attest:
FANNIE ELIOT,
T. M. STETSON.